US009834661B2

United States Patent
Sato et al.

(10) Patent No.: US 9,834,661 B2
(45) Date of Patent: Dec. 5, 2017

(54) RUBBER COMPOSITION FOR TIRE TREAD AND PNEUMATIC TIRE

(71) Applicant: The Yokohama Rubber Co., LTD., Minato-ku, Tokyo (JP)

(72) Inventors: Masaki Sato, Hiratsuka (JP); Makoto Ashiura, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/891,912

(22) PCT Filed: May 15, 2014

(86) PCT No.: PCT/JP2014/062967
§ 371 (c)(1),
(2) Date: Nov. 17, 2015

(87) PCT Pub. No.: WO2014/185495
PCT Pub. Date: Nov. 20, 2014

(65) Prior Publication Data
US 2016/0108210 A1  Apr. 21, 2016

(30) Foreign Application Priority Data

May 17, 2013 (JP) ................................. 2013-105118

(51) Int. Cl.
*C08K 5/5419* (2006.01)
*C08K 3/36* (2006.01)
(Continued)

(52) U.S. Cl.
CPC .............. *C08K 5/5419* (2013.01); *B60C 1/00* (2013.01); *B60C 1/0016* (2013.01); *C08G 81/02* (2013.01);
(Continued)

(58) Field of Classification Search
CPC .......... C08K 5/5419; C08K 3/36; B60C 1/00; B60C 1/0016; C08G 81/02; C08L 87/00; C08L 7/00; C08L 9/00
(Continued)

(56) References Cited

U.S. PATENT DOCUMENTS

2011/0152405 A1* 6/2011 Thomasson ........... B60C 1/0016
523/155
2013/0012651 A1 1/2013 Sasajima
(Continued)

FOREIGN PATENT DOCUMENTS

DE  11 2011 104 012   8/2013
WO  WO 2011/0105362   9/2011
(Continued)

OTHER PUBLICATIONS

International Search Report for International Application No. PCT/JP2014/062967 dated Aug. 12, 2014, 2 pages, Japan.
(Continued)

Primary Examiner — Susannah Chung
Assistant Examiner — Josephine Chang
(74) Attorney, Agent, or Firm — Thorpe North & Western

(57) ABSTRACT

A rubber composition for a tire tread of the present technology comprises a rubber component containing not less than 30 mass % of a conjugated diene-based rubber (A), a silica (B), and a predetermined alkyltriethoxysilane (C), the conjugated diene-based rubber (A) containing not less than 5 mass % of a specified structural member (a), the silica (B) having a nitrogen adsorption specific surface area ($N_2SA$) from 194 to 225 $m^2/g$ and a CTAB adsorption specific surface area (CTAB) from 180 to 210 $m^2/g$, a content of the silica (B) being from 60 to 150 parts by mass per 100 parts
(Continued)

by mass of the rubber component, and a content of the alkyltriethoxysilane (C) being from 2.5 to 8.0 mass % relative to the silica (B).

16 Claims, 1 Drawing Sheet

(51) Int. Cl.
 *B60C 1/00* (2006.01)
 *C08G 81/02* (2006.01)
 *C08L 9/00* (2006.01)
 *C08L 87/00* (2006.01)

(52) U.S. Cl.
 CPC *C08K 3/36* (2013.01); *C08L 9/00* (2013.01); *C08L 87/00* (2013.01); *Y02T 10/862* (2013.01)

(58) Field of Classification Search
 USPC .......................................... 524/265, 493, 465
 See application file for complete search history.

(56) References Cited

U.S. PATENT DOCUMENTS

| | | |
|---|---|---|
| 2013/0172443 A1 | 7/2013 | Kushida et al. |
| 2013/0338255 A1 | 12/2013 | Naka et al. |

FOREIGN PATENT DOCUMENTS

| | | |
|---|---|---|
| WO | WO 2012/035998 | 3/2012 |
| WO | WO 2012/073841 | 6/2012 |

OTHER PUBLICATIONS

Takaaki Imamura, Abrasion Resistance, 1997, pp. 241-258, Nippon Gomu Kyokaishi, Japan.

* cited by examiner

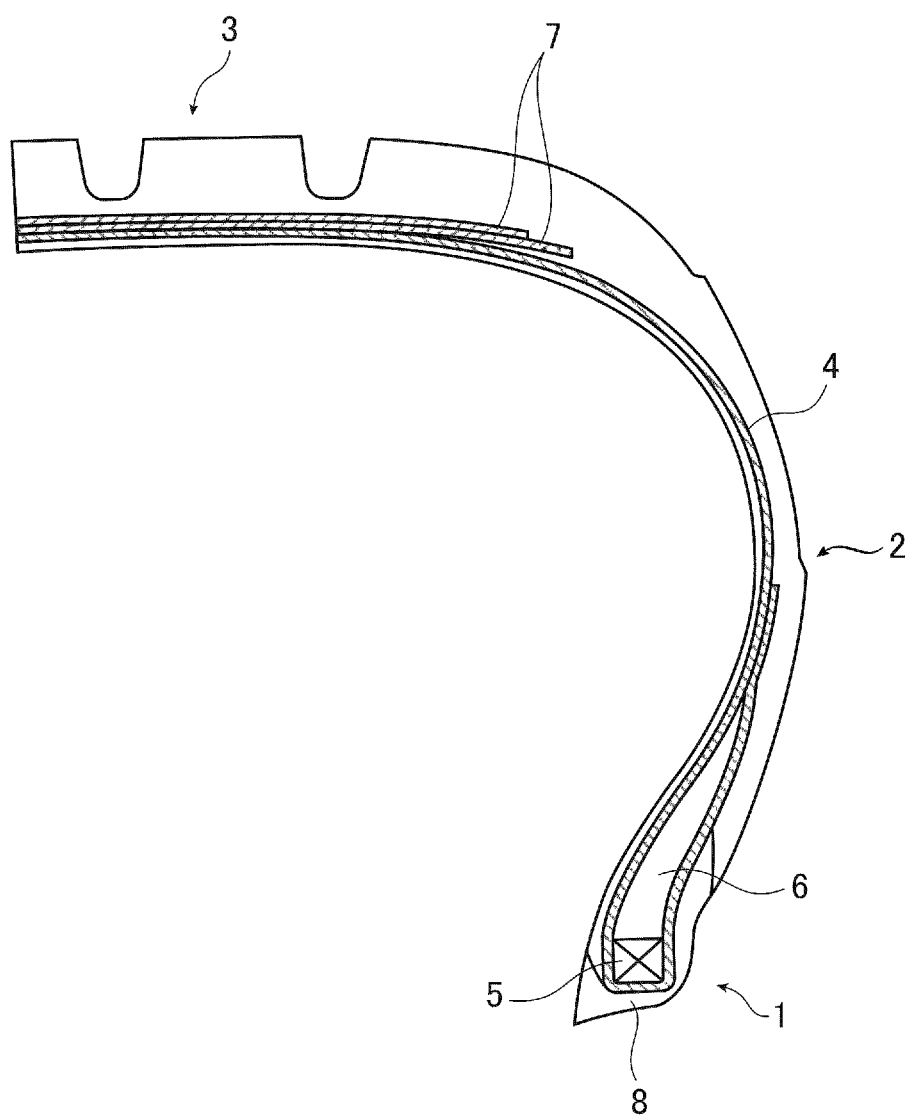

RUBBER COMPOSITION FOR TIRE TREAD AND PNEUMATIC TIRE

TECHNICAL FIELD

The present technology relates to a rubber composition for a tire tread and a pneumatic tire.

BACKGROUND

In recent years, there has been a demand to reduce tire rolling resistance from the perspective of fuel efficiency when a vehicle is traveling. In addition, there has been a demand for enhancement in wet performance from the perspective of safety. A known method of achieving this is a method of compatibility for low rolling resistance and wet performance by adding silica to a rubber component constituting the tread portion of a tire.

However, silica has low affinity with rubber components, and the cohesiveness between silica components is high, so if silica is simply added to the rubber component, the silica is not dispersed, which leads to the problem that the effect of reducing the rolling resistance or the effect of improving the wet performance cannot be sufficiently achieved.

In this connection, International Patent Publication No. WO/2011/105362 discloses a rubber composition including a conjugated diene-based rubber containing an isoprene block. In International Patent Publication No. WO/2011/105362, it is stated that by using the above composition, the affinity between the silica and the rubber is good, and reduced heat build-up (low rolling resistance) and wet grip performance can be enhanced.

In addition, there is also a demand for low viscosity in the rubber composition for a tire tread at the storage stage. In other words, there is a demand for excellent processability.

Meanwhile, environmental issues and resource problems have led to a demand for even fuel efficiency in vehicles, which in turn has led to a demand for further enhancements in the low rolling resistance of tires. In addition, in step with enhancements in the required safety level, there has also been a demand for further enhancements in wet performance and wear resistance.

In this connection, when the present inventors studied the rubber compositions described in International Patent Publication No. WO/2011/105362, there were cases where processability and wear resistance were poor, and it became clear that their low rolling resistance, wet performance, and processability do not satisfy the currently required levels.

SUMMARY

The present technology provides a rubber composition for a tire tread having excellent wet performance, low rolling resistance, and wear resistance when formed into a tire as well as excellent pro cessability, and a pneumatic tire having tire treads formed using the rubber composition.

As a result of diligent research on the above object, the inventors of the present technology discovered that a rubber composition for a tire tread that exhibits excellent wet performance, low rolling resistance, and wear resistance when formed into a tire as well as excellent processability can be obtained through the combined use of a rubber component containing a predetermined content of a specified conjugated diene-based rubber, a specified silica, and a specified alkylsilane, and thus completed the present technology.

Specifically, the inventors discovered that the problems described above can be solved by the following configuration.

(1) A rubber composition for a tire tread comprising a rubber component containing not less than 30 mass % of a conjugated diene-based rubber (A), a silica (B), and an alkyltriethoxysilane (C) represented by the following formula (I), the conjugated diene-based rubber (A) containing not less than 5 mass % of a structural member (a), in which not less than three conjugated diene-based polymer chains (a1) are bonded via a modifier (a2), obtained by a reaction of the conjugated diene-based polymer chains (a1) and the modifier (a2);

the conjugated diene-based polymer chain (a1) including an isoprene block containing not less than 70 mass % of isoprene units on one terminal and containing an active terminal on the other terminal;

the modifier (a2) including at least one group selected from an epoxy group and a hydrocarbyloxysilyl group, a total number of the epoxy groups and hydrocarbyloxy groups contained in the hydrocarbyloxysilyl group being not less than three;

the silica (B) having a nitrogen adsorption specific surface area from 194 to 225 $m^2/g$ and a cetyl trimethyl ammonium bromide (CTAB) adsorption specific surface area from 180 to 210 $m^2/g$;

a content of the silica (B) being from 60 to 150 parts by mass per 100 parts by mass of the rubber component;

a content of the alkyltriethoxysilane (C) being from 2.5 to 8.0 mass % relative to a content of the silica (B):

(wherein R is an alkyl group having from 7 to 20 carbons).

(2) The rubber composition for a tire tread according to (1) above, wherein the modifier (a2) is a polyorganosiloxane.

(3) The rubber composition for a tire tread according to (1) or (2) above, wherein a vinyl bond content derived from an isoprene unit in the isoprene block is from 21 to 85 mass %.

(4) A pneumatic tire comprising a tire tread formed using the rubber composition for a tire tread described in any one of (1) to (3) above.

As will be described below, according to the present technology, it is possible to provide a rubber composition for a tire tread having excellent wet performance, low rolling resistance, and wear resistance when formed into a tire as well as excellent processability, and a pneumatic tire having tire treads formed using the rubber composition.

BRIEF DESCRIPTION OF THE DRAWING(S)

FIG. 1 is a partial cross-sectional schematic view of a tire that represents one embodiment of a pneumatic tire of the present technology.

DETAILED DESCRIPTION

Rubber Composition for a Tire Tread

The rubber composition for a tire tread of the present technology (also abbreviated as "rubber composition of the present technology" hereinafter) comprises a rubber component containing not less than 30 mass % of a conjugated diene-based rubber (A), a silica (B), and an alkyltriethoxysilane (C) represented by the formula (I) to be described later.

Here, the conjugated diene-based rubber (A) contains not less than 5 mass % of a structural member (a), in which not less than three conjugated diene-based polymer chains (a1) are bonded via a modifier (a2), obtained by a reaction of the conjugated diene-based polymer chains (a1) and the modifier (a2).

Furthermore, the conjugated diene-based polymer chain (a1) includes an isoprene block containing not less than 70 mass % of isoprene units on one terminal and containing an active terminal on the other terminal.

Additionally, the modifier (a2) includes at least one group selected from an epoxy group and a hydrocarbyloxysilyl group, the total number of the epoxy groups and the hydrocarbyloxy groups contained in the hydrocarbyloxysilyl groups being not less than three.

Also, the silica (B) has a nitrogen adsorption specific surface area from 194 to 225 $m^2/g$ and a CTAB adsorption specific surface area from 180 to 210 $m^2/g$, and a content of the silica (B) is from 60 to 150 parts by mass per 100 parts by mass of the rubber component.

Additionally, a content of the alkyltriethoxysilane (C) is from 2.5 to 8.0 mass % relative to a content of the silica (B).

It is considered that the rubber composition of the present technology results in a rubber composition for a tire tread that exhibits excellent wet performance, low rolling resistance, wear resistance, as well as processability because it uses predetermined contents of a conjugated diene-based rubber (A) containing a predetermined content of a structural member (a) to be described below, a silica (B), and an alkyltriethoxysilane (C).

Although the reason is not clear, it is assumed to be as follows.

As will be described below, the structural member (a) has a structure in which the conjugated diene-based polymer chains (a1) having an isoprene block are bonded via the modifier (a2). Also, the silica (B) has surface properties that result in the nitrogen adsorption specific surface area and the CTAB adsorption specific surface area being within specified ranges. Additionally, the alkyltriethoxysilane (C) includes three ethoxy groups which are hydrolyzable groups and an alkyl group having a specified number of carbons, as represented by formula (I) to be described later.

In the present technology, through the combined use of a conjugated diene-based rubber (A) containing a predetermined content of the structural member (a), a silica (B), and an alkyltriethoxysilane (C), the hydrolyzable groups (ethoxy groups) of the alkyltriethoxysilane (C) and the isoprene block of the structural member (a) and the functional group in the modifier (a2) all readily interact with the silica (B) and enhance the dispersibility of the silica (B), and as a result, excellent wet performance, low rolling resistance, wear resistance, and processability are exhibited.

In particular, it is thought that excellent wear resistance is exhibited because, because of the nitrogen adsorption specific surface area and the CTAB adsorption specific surface area of the silica (B) being within specified ranges, the balance of reinforcement action on the conjugated diene-based rubber (A) and dispersibility of the silica (B) is enhanced, and more specifically, because of the specific surface area of the silica (B) being not less than a specified value, the reinforcement action on the conjugated diene-based rubber (A) is enhanced, and further, because of the specific surface area of the silica (B) being not greater than a specified value, the state of dispersion is good and there is little adverse effect on wear resistance by poor dispersion. This is also surmised on the basis of the fact that wear resistance got worse or did not improve when silica that does not satisfy these specific surface areas was compounded (refer to Comparative Examples 6 and 7 described later).

Furthermore, it is also thought that excellent wet performance is exhibited because the reinforcement action of the conjugated diene-based rubber (A) is enhanced due to containing a predetermined content of silica (B). This is also surmised on the basis of the fact that wet performance got worse when the content of silica (B) was inadequate (refer to Comparative Example 8 described later).

Additionally, the dispersibility of the silica (B) is thought to be excellent because affinity with the conjugated diene-based rubber (A) is higher due to the alkyltriethoxysilane (C) having three ethoxy groups and an alkyl group having a specified number of carbons. This is also surmised on the basis of the fact that wet performance and low rolling resistance barely improved when dimethyldiethoxysilane was compounded (refer to Comparative Example 10 described later).

Furthermore, it is thought that excellent processability and wear resistance are exhibited because the dispersibility of the silica (B) is enhanced while the plasticizing effect of the conjugated diene-based rubber (A) is also moderately increased due to containing a predetermined content of the alkyltriethoxysilane (C). This is also surmised on the basis of the fact that wear resistance became worse when the content of the alkyltriethoxysilane (C) was high (refer to Comparative Example 4 described later) and the fact that processability was not sufficiently improved when the content of the alkyltriethoxysilane (C) was low (refer to Comparative Example 5 described later).

Each of the components contained in the rubber composition of the present technology will be described in detail hereinafter.

[Rubber Component]

The rubber component included in the rubber composition of the present technology contains not less than 30 mass % of the conjugated diene-based rubber (A) to be described later. The rubber component may also include diene-based rubbers other than the conjugated diene-based rubber (A).

The conjugated diene-based rubber (A) contains not less than 5 mass % of a structural member (a) to be described later, in which not less than three conjugated diene-based polymer chains (a1) are bonded via a modifier (a2) to be described later, obtained by a reaction of the conjugated diene-based polymer chains (a1) and the modifier (a2).

<Conjugated Diene-based Polymer Chain (a1)>

The conjugated diene-based polymer chain (a1) used to form the structural member (a) contained in the conjugated diene-based rubber (A) is not particularly limited as long as it is a polymer chain comprising conjugated diene monomer units, and has an isoprene block on one terminal and an active terminal (polymerization active terminal or living growth terminal) on the other terminal.

The conjugated diene-based polymer chain (a1) can be obtained by forming an isoprene block having an active terminal (polymerization active terminal or living growth terminal) by living polymerization of isoprene or an isoprene mixture containing a predetermined content of isoprene in an inert solvent, and then bonding a conjugated diene monomer or a monomer mixture containing a conjugated diene monomer to the isoprene block having an active terminal, and then performing living polymerization. The above monomer mixture containing a conjugated diene monomer may further contain an aromatic vinyl monomer. Preferably, the monomer mixture containing the above-described conjugated diene monomer may further contain an aromatic vinyl monomer unit.

(Isoprene Block)

The isoprene block is an isoprene homopolymer or a copolymer conjugated isoprene with another monomer, and is a polyisoprene having a content of isoprene units of not less than 70 mass %. The content of isoprene units in the isoprene block is preferably not less than 80 mass %, more preferably not less than 90 mass %, and particularly preferably 100 mass %.

As described above, the conjugated diene-based polymer chain (a1) has the isoprene block on one terminal. The conjugated diene-based polymer chain (a1) may further contain an isoprene block in its chain. The conjugated diene-based polymer may have isoprene blocks on both terminals, of which the isoprene block on one terminal has an active terminal, but from the perspective of productivity it is preferred that only the terminal that is not an active terminal has an isoprene block.

The weight average molecular weight of the isoprene block is not particularly limited, but from the perspective of strength it is preferably from 500 to 25,000, more preferably from 1,000 to 15,000, and particularly preferably from 1,500 to 10,000.

The molecular weight distribution represented by the ratio (Mw/Mn) of the weight average molecular weight (Mw) to the number average molecular weight (Mn) of the isoprene block is not particularly limited, but from the perspective of productivity it is preferably from 1.0 to 1.5, more preferably from 1.0 to 1.4, and particularly preferably from 1.0 to 1.3.

The other monomer that can copolymerize with isoprene that may be used to obtain an isoprene block is not particularly limited as long as it can copolymerize with isoprene, but examples include 1,3-butadiene, styrene, α-methylstyrene, and the like. Among these, styrene is preferred. The content of other monomer units in the isoprene block is less than 30 mass %, preferably less than 20 mass %, and more preferably less than 10 mass %, and it is particularly preferred that no monomers other than isoprene units are contained.

The inert solvent used in polymerization of isoprene (or isoprene mixture) is not particularly limited as long as it is one normally used in solution polymerization and does not hinder the polymerization reaction. Specific examples include open-chain aliphatic hydrocarbons such as butane, pentane, hexane, heptane, and 2-butene, alicyclic hydrocarbons such as cyclopentane, cyclohexane, and cyclohexene, aromatic hydrocarbons such as benzene, toluene, and xylene, and the like. The used amount of inert solvent is not particularly limited, but normally, it is preferably an amount that results in the concentration of all monomers (isoprene and other monomers) being from 1 to 50 mass %, and preferably from 10 to 40 mass %.

The polymerization initiator used when synthesizing the isoprene block is not particularly limited as long as it can living-polymerize the isoprene (or isoprene mixture) and provide a polymer chain having an active terminal, but examples include polymerization initiators having a primary catalyst of an organic alkali metal compound, organic alkali earth metal compound, or lanthanide series metal compound. Specific examples of the organic alkali metal compound include organic monolithium compounds such as n-butyllithium, sec-butyllithium, t-butyllithium, hexyl lithium, phenyl lithium, stilbene lithium, and the like; organic polyhydric lithium compounds such as dilithiomethane, 1,4-dilithiobutane, 1,4-dilithio-2-ethylcyclohexane, 1,3,5-trilithiobenzene, 1,3,5-tris(lithiomethyl)benzene, and the like; organic sodium compounds such as sodium naphthalene and the like; and organic potassium compounds such as potassium naphthalene and the like; and the like. Examples of the organic alkali earth metal compound include di-n-butylmagnesium, di-n-hexylmagnesium, diethoxycalcium, calcium distearate, di-t-butoxystrontium, diethoxybarium, diisopropoxybarium, diethylmercaptobarium, di-t-butoxybarium, diphenoxybarium, diethylaminobarium, barium distearate, diketylbarium, and the like. Examples of polymerization initiators having a lanthanide series metal compound as a primary catalyst include polymerization initiators containing a primary catalyst of a lanthanide series metal salt containing a lanthanide series metal such as lanthanum, cerium, praseodymium, neodymium, samarium, and gadolinium, and a carboxylic acid or phosphorus-containing organic acid, together with a promoter such as an alkylaluminum compound, organoaluminum hydride compound, or organoaluminum halide compound. Among these polymerization initiators, organic monolithium compounds and organic polyvalent lithium compounds are preferred, organic monolithium compounds are more preferred, and n-butyllithium is particularly preferred. Furthermore, the organic alkali metal compound may be used as an organic alkali metal amide compound after first reacting it with a secondary amine such as dibutylamine, dihexylamine, dibenzylamine, pyrrolidine, hexamethyleneimine, and heptamethyleneimine (preferably pyrrolidine, hexamethyleneimine or heptamethyleneimine). A single polymerization initiator may be used alone or a combination of two or more polymerization initiators may be used.

The used amount of polymerization initiator should be determined according to the targeted molecular weight, but it is preferably from 4 to 250 mmol, more preferably from 30 to 200 mmol, and particularly preferably from 40 to 100 mmol, per 100 g of the isoprene (or isoprene mixture).

The polymerization temperature when polymerizing the isoprene (or isoprene mixture) is normally from −80 to 150° C., preferably from 0 to 100° C., and more preferably from 20 to 90° C.

To adjust the vinyl bond content derived from an isoprene unit in the isoprene block, a polar compound is preferably added to the inert organic solvent at the time of polymerization. Examples of the polar compound include ether compounds such as dibutylether, tetrahydrofuran, and 2,2-di(tetrahydrofuryl)propane; tertiary amines such as tetramethylethylenediamine; alkali metal alkoxides; phosphine compounds; and the like. Among these, ether compounds and tertiary amines are preferred, among which those capable of forming a chelate structure with the metal of the polymerization initiator are more preferred, and 2,2-di(tetrahydrofuryl)propane and tetramethylethylenediamine are particularly preferred. The used amount of polar compound should be determined according to the targeted vinyl bond content, but it is preferably from 0.1 to 30 mol, and more preferably from 0.5 to 10 mol, per 1 mol of the polymerization initiator. When the used amount of polar compound is within this range, it is easy to adjust the vinyl bond content, and problems due to deactivation of the polymerization initiator tend not to Occur.

To obtain superior wet performance, the vinyl bond content derived from an isoprene unit in the isoprene block is preferably from 21 to 85 mass %, more preferably from 50 to 80 mass %, and even more preferably from 70 to 80 mass %. Furthermore, the vinyl bond content derived from an isoprene unit is the proportion (mass %) of the total of 1,2-vinyl bonds derived from isoprene units and 3,4-vinyl bonds derived from isoprene units in the isoprene block.

(Portion Other than Isoprene Block)

The portion other than the isoprene block in the conjugated diene-based polymer chain (a1) is preferably a homopolymer chain of a conjugated diene monomer or a copolymer chain of a conjugated diene monomer and an aromatic vinyl monomer. The mass ratio of conjugated diene monomer units to aromatic vinyl monomer units (conjugated diene monomer units:aromatic vinyl monomer units) in a portion other than the isoprene block is preferably from 100:0 to 50:50, and more preferably from 90:10 to 70:30.

The conjugated diene monomer used to obtain a portion other than the isoprene block in the conjugated diene-based polymer chain (a1) is not particularly limited, but examples include 1,3-butadiene, isoprene (2-methyl-1,3-butadiene), 2,3-dimethyl-1,3-butadiene, 2-chloro-1,3-butadiene, 1,3-pentadiene, 1,3-hexadiene, and the like. Among these, 1,3-butadiene or isoprene is preferred, and 1,3-butadiene is more preferred. A single conjugated diene monomer may be used alone, or a combination of two or more conjugated diene monomers may be used.

The aromatic vinyl monomer used to obtain a portion other than the isoprene block in the conjugated diene-based polymer chain (a1) is not particularly limited, but examples include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinylnaphthalene, dimethylaminomethylstyrene, dimethylaminoethylstyrene, and the like. Among these, styrene, α-methylstyrene, and 4-methylstyrene are preferred, and styrene is more preferred. A single aromatic vinyl monomer may be used alone, or a combination of two or more aromatic vinyl monomers may be used.

The monomer used to obtain a portion other than the isoprene block in the conjugated diene-based polymer chain (a1) may be a monomer other than a conjugated diene monomer or aromatic vinyl monomer as desired, provided that the essential characteristics in the present technology are maintained. Examples of other monomers include α- and β-unsaturated nitriles such as acrylonitrile and methacrylonitrile; unsaturated carboxylic acids or acid anhydrides such as acrylic acid, methacrylic acid, and maleic anhydride; unsaturated carboxylic acid esters such as methylmethacrylate, ethylacrylate, and butylacrylate; and unconjugated dienes such as 1,5-hexadiene, 1,6-heptadiene, 1,7-octadiene, dicyclopentadiene, and 5-ethylidene-2-norbornene; and the like. The used amount of these monomers is preferably not greater than mass %, more preferably not greater than 5 mass %, of the total of all monomers used to obtain the portion other than the isoprene block in the conjugated diene-based polymer chain (a1).

The inert solvents used in polymerization of the portion other than the isoprene block in the conjugated diene-based polymer chain (a1) are the same as the inert solvents used in synthesis of the isoprene block described above.

The isoprene block containing an active terminal described above may be used unaltered as the polymerization initiator used in synthesis of the portion other than the isoprene block in the conjugated diene-based polymer chain (a1). The used amount of polymerization initiator should be determined according to the targeted molecular weight, but is preferably from 0.1 to 5 mmol, more preferably from 0.2 to 2 mmol, and particularly preferably from 0.3 to 1.5 mmol, per 100 g of the monomer (mixture).

The polymerization temperature when polymerizing the portion other than the isoprene block in the conjugated diene-based polymer chain (a1) is normally from −80 to 150° C., preferably from 0 to 100° C., and more preferably from 20 to 90° C. The polymerization mode may be some modes such as batch mode or continuous mode. When a copolymer chain of a conjugated diene monomer and an aromatic vinyl monomer is used as a portion other than the isoprene block in the conjugated diene-based polymer chain (a1), or when a copolymer chain containing two or more types of conjugated diene monomer is used, batch polymerization is preferred in that random bonding is easy to control.

When a copolymer chain of a conjugated diene monomer and an aromatic vinyl monomer is used as a portion other than the isoprene block in the conjugated diene-based polymer chain (a1), or when a copolymer chain containing two or more types of conjugated diene monomer is used, the bonding type of the monomers may be a variety of bonding types such as block, tapered, random, or the like. Among these, random bonding is preferred. When the bonding style between the conjugated diene monomer and the aromatic vinyl monomer is random, it is preferred that the conjugated diene monomer or the conjugated diene monomer and aromatic vinyl monomer are supplied and polymerized continuously or intermittently to the polymerization system so that the ratio of the aromatic vinyl monomer relative to the total of conjugated diene monomer and aromatic vinyl monomer is not too high.

To adjust the vinyl bond content in the portion other than the isoprene block of the conjugated diene-based polymer chain (a1), a polar compound is preferably added to the inert organic solvent at the time of polymerization, similar to when adjusting the vinyl bond content derived from an isoprene unit in the isoprene block. However, a polar compound does not have to be added again if a polar compound was already added to the inert organic solvent in an amount sufficient to adjust the vinyl bond content in the portion other than the isoprene block of the conjugated diene-based polymer chain when the isoprene block was synthesized. Specific examples of the polar compound used to adjust the vinyl bond content in the portion other than the isoprene block are the same as the polar compounds used in synthesis of the isoprene block described above. The used amount of polar compound should be determined according to the targeted vinyl bond content, but is preferably from 0.01 to 100 mol, and more preferably from 0.1 to 30 mol, per 1 mol of the polymerization initiator. When the used amount of polar compound is within this range, it is easy to adjust the vinyl bond content in the portion other than the isoprene block, and problems due to deactivation of the polymerization initiator tend not to occur.

From the perspective of obtaining a balance of viscoelastic characteristics and strength, the vinyl bond content in the portion other than the isoprene block of the conjugated diene-based polymer chain (a1) is preferably from 10 to 90 mass %, and more preferably from 20 to 80 mass %.

Note that the vinyl bond content in the portion other than the isoprene block is the proportion (mass %) of vinyl bond units in the portion other than the isoprene block of the conjugated diene-based polymer chain (a1).

(Molecular Weight of Conjugated Diene-based Polymer Chain (a1))

The weight average molecular weight of the conjugated diene-based polymer chain (a1) is not particularly limited, but is preferably from 1,000 to 2,000,000, more preferably from 10,000 to 1,500,000, and particularly preferably from 100,000 to 1,000,000. When the weight average molecular weight of the conjugated diene-based polymer chain (a1) is within the above range, the balance of strength and low rolling resistance of the tire is good.

The ratio (Mw/Mn) of the weight average molecular weight (Mw) to the number average molecular weight (Mn) of the conjugated diene-based polymer chain (a1) is preferably from 1.0 to 3.0, more preferably from 1.0 to 2.5, and particularly preferably from 1.0 to 2.2. When this value of molecular weight distribution (Mw/Mn) is within the above range, the conjugated diene-based rubber (A) is easy to produce.

(Production Method of Conjugated Diene-based Polymer Chain (a1))

The conjugated diene-based polymer chain (a1) may be obtained by, for example, first forming an isoprene block containing an active terminal by living polymerization of isoprene (or an isoprene mixture) using a polymerization initiator in an inert solvent, followed by living polymerization of a monomer such as a conjugated diene monomer using this isoprene block as a new polymerization initiator. In this case, the isoprene block may be added to a solution of the monomer such as a conjugated diene monomer, or the monomer such as a conjugated diene monomer may be added to a solution of the isoprene block, but it is preferred that the isoprene block is added to a solution of the monomer such as a conjugated diene monomer. Furthermore, an isoprene block may be formed on the active terminal side of the conjugated diene-based polymer chain (a1) by adding isoprene (or an isoprene mixture) anew at the point when the polymer conversion rate of the monomer such as a conjugated diene monomer reaches, normally, 95% or greater. The used amount of this isoprene (or isoprene mixture) is preferably from 10 to 100 mol, more preferably from 15 to 70 mol, and particularly preferably from 20 to 35 mol, relative to 1 mol of the polymerization initiator used in the first polymerization reaction.

(Preferred Embodiments of Conjugated Diene-based Polymer Chain (a1))

The conjugated diene-based polymer chain (a1) preferably contains an aromatic vinyl monomer unit, but it is not required. The preferred range of the mass ratio of conjugated diene monomer units to aromatic vinyl monomer units (conjugated diene monomer units:aromatic vinyl monomer units) in the conjugated diene-based polymer chain (a1) is the same as that of the portion other than the isoprene block described above. The preferred range of the vinyl bond content in the conjugated diene-based polymer chain (a1) is also the same as that of the portion other than the isoprene block described above. Note that the vinyl bond content in the conjugated diene-based polymer chain (a1) is the proportion (mass %) of vinyl bond units in the conjugated diene-based polymer chain (a1).

<Modifier (a2)>

The conjugated diene-based rubber (A) used in the present technology is formed by a reaction between the active terminal of the conjugated diene-based polymer chain (a1) obtained as described above and a modifier (a2) containing at least one group selected from an epoxy group and a hydrocarbyloxysilyl group (—OR: where R is hydrocarbon groups or aryl groups), wherein the total number of the epoxy groups and the hydrocarbyloxy groups contained in the hydrocarbyloxysilyl group is not less than three.

In the present technology, a "modifier" is a compound that contains, in each molecule, a functional group that reacts with the active terminal of the conjugated diene-based polymer chain (a1). However, the contained functional groups are limited to those having affinity with silica. In the present technology, the above functional group is an epoxy group or a hydrocarbyloxy group contained in a hydrocarbyloxysilyl group.

The modifier (a2) used in forming the structural member (a) contained in the conjugated diene-based rubber of the present technology is not particularly limited as long as it contains at least one group selected from an epoxy group and a hydrocarbyloxysilyl group, and the total number of the epoxy groups and the hydrocarbyloxy groups contained in the hydrocarbyloxysilyl group is not less than three. Specifically, the modifier (a2) may be one having not less than three epoxy groups per molecule or one having a hydrocarbyloxysilyl group, or one containing not less than three hydrocarbyloxy groups bonded to silicon atoms in a hydrocarbyloxysilyl group per molecule. Additionally, it may be one containing both epoxy groups and hydrocarbyloxysilyl groups in the molecule, wherein the total of the epoxy groups and the hydrocarbyloxy groups bonded to silicon atoms in the hydrocarbyloxysilyl group is not less than three. Furthermore, when the modifier (a2) is described as containing a hydrocarbyloxysilyl group and containing not less than two hydrocarbyloxy groups bonded to silicon atoms in the hydrocarbyloxysilyl group per molecule, it indicates a molecule containing two or more silicon atoms having one hydrocarbyloxy group, a molecule having two or more hydrocarbyloxy groups on the same silicon atom, or a combination thereof. Note that when an organic group other than a hydrocarbyloxy group is bonded to a silicon atom of the hydrocarbyloxysilyl group, this organic group is not particularly limited.

It is considered that when the conjugated diene-based polymer chain (a1) reacts with a modifier (a2) containing an epoxy group, through ring-opening of at least some of the epoxy groups in the modifier (a2), a bond is formed between a carbon atom of the portion where the epoxy group ring-opened and the active terminal of the conjugated diene-based polymer chain (a1). Furthermore, it is considered that when the conjugated diene-based polymer chain (a1) reacts with a modifier (a2) containing a hydrocarbyloxysilyl group, through detachment of at least some of the hydrocarbyloxy groups in the hydrocarbyloxysilyl groups in the modifier (a2), a bond is formed between a silicon atom contained in the modifier (a2) and the active terminal of the conjugated diene-based polymer chain (a1).

By using a modifier (a2) containing not less than a total of three epoxy groups and hydrocarbyloxy groups contained in hydrocarbyloxysilyl groups, a conjugated diene-based rubber (A) containing a structural element (a) in which not less than three of the above conjugated diene-based polymer chains (a1) are bonded via the above modifier (a2) is obtained.

Examples of the hydrocarbyloxysilyl group contained in the modifier (a2) include alkoxysilyl groups such as a methoxysilyl group, an ethoxysilyl group, a propoxysilyl group, and a butoxysilyl group; and aryloxysilyl groups such as a phenoxysilyl group. Among these, an alkoxysilyl group is preferred, and an ethoxysilyl group is more preferred.

Examples of the hydrocarbyloxy group contained in the hydrocarbyloxysilyl group contained in the modifier (a2) include alkoxy groups such as a methoxy group, an ethoxy group, a propoxy group, and a butoxy group; and aryloxy groups such as a phenoxy group. Among these, an alkoxy group is preferred, and an ethoxy group is more preferred.

The modifier (a2) is preferably a polyorganosiloxane from the perspective of superior wet performance and low rolling resistance.

Examples of preferred embodiments of the modifier (a2) include polyorganosiloxanes represented by formula (1) below, polyorganosiloxanes represented by formula (2) below, polyorganosiloxanes represented by formula (3) below, and hydrocarbyloxysilanes represented by formula (4) below. Above all, polyorganosiloxanes represented by formula (1) below, polyorganosiloxanes represented by formula (2) below, and polyorganosiloxanes represented by formula (3) below are preferred, and polyorganosiloxanes represented by formula (1) below are more preferred.

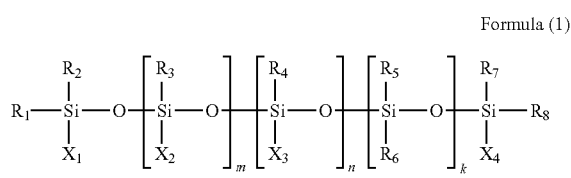

Formula (1)

In formula (1) above, $R_1$ to $R_8$ are identical or different and are alkyl groups having from 1 to 6 carbons or aryl groups having from 6 to 12 carbons. In formula (1) above, $X_1$ and $X_4$ are identical or different and are alkoxy groups having from 1 to 5 carbons, aryloxy groups having from 6 to 14 carbons, epoxy group-containing groups having from 4 to 12 carbons, alkyl groups having from 1 to 6 carbons, or aryl groups having from 6 to 12 carbons. In formula (1) above, $X_2$ is an alkoxy group having from 1 to 5 carbons, an aryloxy group having from 6 to 14 carbons, or an epoxy group-containing group having from 4 to 12 carbons. In formula (1) above, $X_3$ is a group containing from 2 to 20 repeating alkylene glycol units. In formula (1) above, m is an integer from 3 to 200, n is an integer from 0 to 200, and k is an integer from 0 to 200.

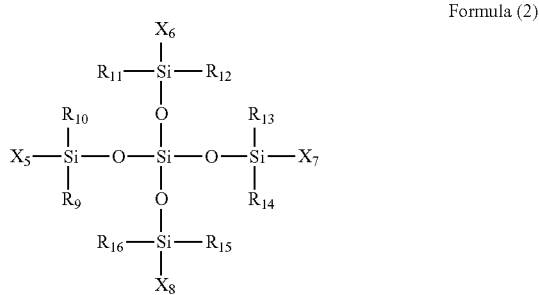

Formula (2)

In formula (2) above, $R_9$ to $R_{16}$ are identical or different and are alkyl groups having from 1 to 6 carbons or aryl groups having from 6 to 12 carbons. In formula (2) above, $X_5$ to $X_8$ are identical or different and are alkoxy groups having from 1 to 5 carbons, aryloxy groups having from 6 to 14 carbons, or epoxy group-containing groups having from 4 to 12 carbons.

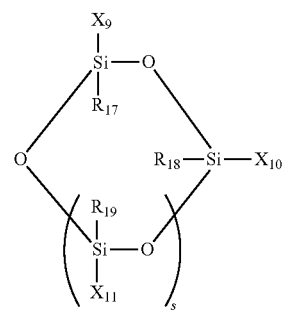

Formula (3)

In formula (3) above, $R_{17}$ to $R_{19}$ are identical or different and are alkyl groups having from 1 to 6 carbons or aryl groups having from 6 to 12 carbons. In formula (3) above, $X_9$ to $X_{11}$ are identical or different and are alkoxy groups having from 1 to 5 carbons, aryloxy groups having from 6 to 14 carbons, or epoxy group-containing groups having from 4 to 12 carbons. In formula (3) above, s is an integer from 1 to 18.

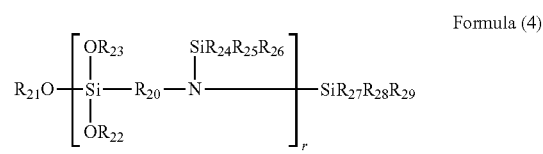

Formula (4)

In formula (4) above, $R_{20}$ is an alkylene group having from 1 to 12 carbons. In formula (4) above, $R_{21}$ to $R_{29}$ are identical or different and are alkyl groups having from 1 to 6 carbons or aryl groups having from 6 to 12 carbons. In formula (4) above, r is an integer from 1 to 10.

Examples of the alkyl groups having from 1 to 6 carbons represented by $R_1$ to $R_8$, $X_1$, and $X_4$ in the polyorganosiloxanes expressed by formula (1) above include a methyl group, an ethyl group, an n-propyl group, an isopropyl group, a butyl group, a pentyl group, a hexyl group, a cyclohexyl group, and the like. Examples of the aryl groups having from 6 to 12 carbons include a phenyl group, a methylphenyl group, and the like. Among these, a methyl group and an ethyl group are preferred from the perspective of production of the polyorganosiloxane itself.

Examples of the alkoxyl groups having from 1 to 5 carbons represented by $X_1$, $X_2$, and $X_4$ in the polyorganosiloxanes expressed by formula (1) above include a methoxy group, an ethoxy group, a propoxy group, an isopropoxy group, a butoxy group, and the like. Above all, a methoxy group and an ethoxy group are preferred from the perspective of reactivity with the active terminal of the conjugated diene-based polymer chain (a1).

Examples of the aryloxy groups having from 6 to 14 carbons represented by $X_1$, $X_2$, and $X_4$ in the polyorganosiloxanes expressed by formula (1) above include a phenoxy group, a tolyloxy group, and the like.

Examples of the epoxy group-containing groups having from 4 to 12 carbons represented by $X_1$, $X_2$, and $X_4$ in the polyorganosiloxanes expressed by formula (1) above include groups represented by formula (5) below.

Formula (5)

In formula (5), $Z_1$ is an alkylene group or an alkyl arylene group having from 1 to 10 carbons; $Z_2$ is a methylene group, a sulfur atom, or an oxygen atom; and E is an epoxy group-containing hydrocarbyl group (hydrocarbon group) having from 2 to 10 carbons. In formula (5), * indicates a bond position.

In the groups represented by formula (5) above, preferably, $Z_2$ is an oxygen atom; more preferably, $Z_2$ is an oxygen atom and E is a glycidyl group; and even more preferably, $Z_1$ is an alkylene group having three carbons, $Z_2$ is an oxygen atom, and E is a glycidyl group.

In the polyorganosiloxane expressed by formula (1) above, preferably, $X_1$ and $X_4$ are epoxy group-containing groups having from 4 to 12 carbons or alkyl groups having from 1 to 6 carbons among the above, and preferably, $X_2$ is an epoxy group-containing group having from 4 to 12 carbons among the above. More preferably, $X_1$ and $X_4$ are alkyl groups having from 1 to 6 alkyl groups and $X_2$ is an epoxy group-containing group having from 4 to 12 carbons.

In the polyorganosiloxane expressed by formula (1) above, a group represented by formula (6) below, i.e., a group including from 2 to 20 repeating alkylene glycol units, is preferred as $X_3$.

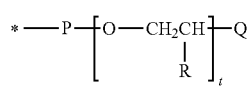

Formula (6)

In formula (6) above, t is an integer from 2 to 20, P is an alkylene group or an alkyl arylene group having from 2 to 10 carbons, R is a hydrogen atom or a methyl group, and Q is an alkoxy group or an aryloxy group having from 1 to 10 carbons. In formula (6), * indicates a bond position. Among these, preferably, t is an integer from 2 to 8, P is an alkylene group having 3 carbons, R is a hydrogen atom, and Q is a methoxy group.

In the polyorganosiloxanes represented by formula (1) above, m is an integer preferably from 20 to 150, and more preferably from 30 to 120, because low rolling resistance and mechanical strength are superior.

In the polyorganosiloxanes represented by formula (1) above, n is an integer preferably from 0 to 150, and more preferably from 0 to 120. In the polyorganosiloxanes represented by formula (1) above, k is an integer preferably from 0 to 150, and more preferably from 0 to 120.

In the polyorganosiloxanes represented by formula (1) above, the total of m, n, and k is preferably not greater than 400, more preferably not greater than 300, and particularly preferably not greater than 250. When the total of m, n, and k is not greater than 400, production of the polyorganosiloxane itself is easy and it is easy to handle without viscosity being too high.

In the polyorganosiloxane represented by formula (2) above, the specific examples and preferred embodiments of $R_9$ to $R_{16}$ are the same as those of $R_1$ to $R_8$ in the above formula (1). In the polyorganosiloxane represented by formula (2) above, the specific examples and preferred embodiments of $X_5$ to $X_8$ are the same as those of $X_2$ in the above formula (1).

In the polyorganosiloxanes represented by formula (3) above, the specific examples and preferred embodiments of $R_{17}$ to $R_{19}$ are the same as those of $R_1$ to $R_8$ in the above formula (1). In the polyorganosiloxanes represented by formula (3) above, the specific examples and preferred embodiments of $X_9$ to $X_{11}$ are the same as those of $X_2$ in the above formula (1).

In the hydrocarbyloxysilanes represented by formula (4) above, examples of the alkylene group having from 1 to 12 carbons represented by $R_{20}$ are a methylene group, an ethylene group, and a propylene group. Among these, a propylene group is preferred.

In the hydrocarbyloxysilanes represented by formula (4) above, the specific examples and preferred embodiments of $R_{21}$ to $R_{29}$ are the same as those of $R_1$ to $R_8$ in the above formula (1).

Specific examples of the hydrocarbyloxysilanes represented by formula (4) above are N,N-bis(trimethylsilyl)-3-aminopropyltrimethoxysilane, N,N-bis(trimethylsilyl)-3-aminopropyltriethoxysilane, N,N-bis(trimethylsilyl)aminoethyltrimethoxysilane, N,N-bis(trimethylsilyl)aminoethyltriethoxysilane, and the like. Above all, N,N-bis(trimethylsilyl)-3-aminopropyltrimethoxysilane and N,N-bis(trimethylsilyl)-3-aminopropyltriethoxysilane are preferred.

Other examples of the modifier (a2) include tetraalkoxysilane compounds such as tetramethoxysilane; hexaalkoxysilane compounds such as bis(trimethoxysilyl)methane; alkylalkoxysilane compounds such as methyltriethoxysilane; alkenylalkoxysilane compounds such as vinyltrimethoxysilane; arylalkoxysilane compounds such as phenyltrimethoxysilane; halogenoalkoxysilane compounds such as triethoxychlorosilane; epoxy group-containing alkoxysilane compounds such as 3-glycidoxyethyltrimethoxysilane, 3-glycidoxybutylpropyltrimethoxysilane, and bis(3-glycidoxypropyl)dimethoxysilane; sulfur-containing alkoxysilane compounds such as bis(3-(triethoxysilyl)propyl)disulfide; amino group-containing alkoxysilane compounds such as bis(3-trimethoxysilylpropyl)methylamine; isocyanate group-containing alkoxysilane compounds such as tris(3-trimethoxysilylpropyl)isocyanurate; epoxy group-containing compounds such as tetraglycidyl-1,3-bisaminomethylcyclohexane; and the like.

A single modifier (a2) may be used alone or a combination of two or more may be used.

The used amount of modifier (a2) is not particularly limited, but the proportion of the total number of moles of epoxy groups and the hydrocarbyloxy groups contained in hydrocarbyloxysilyl groups in the modifier (a2) that react with the active terminal of the conjugated diene-based polymer chain (a1), relative to the number of moles of polymerization initiator used in the polymerization reaction, is normally from 0.1 to 5, and, from the perspective of superior low rolling resistance and mechanical strength, preferably from 0.5 to 3.

Before reacting the conjugated diene-based polymer chain (a1) with the above modifier (a2), a polymerization inhibitor, a polymerization terminal modifier other than the modifier (a2), and a coupling agent may be added to the polymerization system to deactivate some of the active terminals of the conjugated diene-based polymer chain (a1).

Examples of the polymerization terminal modifier and coupling agent used in this case include N-substituted cyclic amines such as N-methyl-2-pyrrolidone, N-vinyl-2-pyrrolidone, N-phenyl-2-pyrrolidone, and N-methyl-ε-caprolactam; N-substituted cyclic ureas such as 1,3-dimethylethylene urea and 1,3-diethyl-2-imidazolidinone; N-substituted aminoketones such as 4,4'-bis(dimethylamino)benzophenone and 4,4'-bis(diethylamino)benzophenone; aromatic isocyanates such as diphenylmethane diisocyanate and 2,4-tolylene diisocyanate; N,N-di-substituted aminoalkylmethacrylamides such as N,N-dimethylaminopropylmethacrylamide; N-substituted aminoaldehydes such as 4-N,N-dimethylaminobenzaldehyde; N-substituted carbodiimides such as dicyclohexylcarbodiimide; Schiff bases such as N-ethylethylidene imine and N-methylbenzylidene imine; pyridyl group-containing vinyl compounds such as 4-vinylpyridine; halogenated metal compounds such as tin tetrachloride, silicon tetrachloride, hexachlorodisilane, bis (trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, and 1,6-bis(trichlorosilyl)hexane; and the like. Among these, from the perspective of superior coupling efficiency, use of a halogenated metal compound as a coupling agent is preferred, use of a halogenated silicon compound having not less than five silicon-halogen atom bonds per molecule is more preferred, and 1,6-bis(trichlorosilyl)hexane is particularly preferred.

The used amount of coupling agent is not particularly limited as long as it is in a range that does not hinder the effect of the present technology. For example, for a halogenated silicon compound containing not less than five silicon-halogen atom bonds per molecule, the proportion of the number of moles of silicon-halogen atom bonds of the halogenated silicon compound relative to the number of moles of the polymerization initiator used in the polymerization reaction is preferably from 0.001 to 0.25, and more preferably from 0.01 to 0.2, because low rolling resistance and mechanical strength are superior.

A single coupling agent may be used alone or a combination of two or more may be used.

When adding the modifier (a2), the coupling agent, and the like to the solution containing the conjugated diene-based polymer chain (a1), it is preferable to add them to the polymerization system after dissolving them in an inert solvent from the perspective of controlling the reaction well. The solution concentration is preferably from 1 to 50 mass %.

<Conjugated Diene-based Rubber (A)>

The conjugated diene-based rubber (A) contains not less than 5 mass % of a structural member, in which not less than three conjugated diene-based polymer chains (a1) are bonded via a modifier (a2), obtained by a reaction of the conjugated diene-based polymer chains (a1) and the modifier (a2).

The reaction between the conjugated diene-based polymer chain (a1) and the modifier (a2) may be performed by, for example, adding the modifier (a2) to a solution containing the conjugated diene-based polymer chain (a1). The timing of adding the modifier (a2), coupling agent, and the like is not particularly limited, but it is desirable to add them in a state where the polymerization reaction in the conjugated diene-based polymer chain (a1) has not been completed and the solution containing the conjugated diene-based polymer chain (a1) contains a monomer such as isoprene. More specifically, the modifier (a2), coupling agent, and the like are preferably added to the solution containing the conjugated diene-based polymer chain (a1) while the solution is in a state where it contains preferably not less than 100 ppm, and more preferably from 300 to 50,000 ppm, of monomer. By adding the modifier (a2), the coupling agent, and the like, it is possible to control the reaction well by suppressing side reactions between the conjugated diene-based polymer chain (a1) and impurities contained in the polymerization system.

When two or more types among the modifier (a2), coupling agent, and the like are used in combination in obtaining the conjugated diene-based rubber (A), the order in which they are added to the polymerization system is not particularly limited. Even when the modifier (a2) is used in combination with a halogenated silicon compound as a coupling agent containing not less than five silicon-halogen atom bonds per molecule, the order of addition thereof is not particularly limited, but the coupling agent is preferably added before the modifier (a2). By adding them in this order, a highly branched conjugated diene-based rubber obtained via the coupling agent is readily obtained, and a tire obtained using this highly branched conjugated diene-based rubber has superior steering stability.

As the conditions when reacting the modifier (a2), the coupling agent, and the like, the temperature is normally from 0 to 100° C. and preferably from 30 to 90° C., and the reaction time of each is normally from 1 to 120 minutes and preferably from 2 to 60 minutes.

After the modifier (a2) is reacted with the conjugated diene-based polymer chain (a1), it is preferred that an alcohol such as methanol or water is added to deactivate the active terminal.

After the active terminal of the conjugated diene-based polymer chain (a1) is deactivated, antiaging agents such as phenol-based stabilizers, phosphorus-based stabilizers, or sulfur-based stabilizers, crumbling agents, antiscale agents, and the like are added as desired, and then the polymerization solvent is separated from the polymerization solution by direct drying or steam stripping, to yield the conjugated diene-based rubber (A). Furthermore, before separating the polymerization solvent from the polymerization solution, extender oil may be added to the polymerization solution to yield the conjugated diene-based rubber (A) as an oil-extended rubber.

Examples of the extender oil used when recovering the conjugated diene-based rubber (A) as an oil-extended rubber include paraffin-based, aromatic, and naphthene-based petroleum-based softeners, vegetable-based softeners, fatty acids, and the like. When a petroleum-based softener is used, the polycyclic aromatic content is preferably less than 3%. This content is measured by the method of IP346 (test method of the U.K. Institute of Petroleum). When an extender oil is used, the used amount is normally from 5 to 100 parts by mass, preferably from 10 to 60 parts by mass, and more preferably from 20 to 50 parts by mass, relative to 100 parts by mass of the conjugated diene-based rubber (A).

The conjugated diene-based rubber (A) contains not less than 5 mass %, preferably from 5 to 40 mass %, and particularly preferably from 10 to 30 mass %, of the structural unit (a) in which not less than three conjugated diene-based polymer chains (a1) are bonded via the modifier (a2).

The proportion of structural member (a) in which not less than three conjugated diene-based polymer chains (a1) are bonded via the modifier (a2) relative to the total amount of the conjugated diene-based rubber (A) that is ultimately obtained is expressed as the "ratio of coupling of not less than three branches (mass %)" (simply called "coupling ratio" hereinafter). This coupling ratio may be measured by gel permeation chromatography (GPC)(in terms of polystyrene). From the chart obtained by gel permeation chromatography measurement, the ratio (s2/s1) of the area (s2) of the peak portion having a peak top molecular weight not less than 2.8 times the peak top molecular weight indicated by the peak of smallest molecular weight to the total elution area (s1) is taken as the ratio of coupling of not less than three branches. Furthermore, when a coupling agent other than the modifier (a2) is added before modification, a sample is taken before the modifier (a2) is added, and by performing GPC, the proportion of conjugated diene-based polymer chain bonded only to the coupling agent can be corrected for.

The weight average molecular weight of the conjugated diene-based rubber (A) is not particularly limited, but the value measured by gel permeation chromatography in terms of polystyrene is normally from 1,000 to 3,000,000, preferably from 100,000 to 2,000,000, and more preferably from 300,000 to 1,500,000. When the weight average molecular weight is not greater than 3,000,000, compounding of the silica (Q) in the conjugated diene-based rubber (A) is easy, and scorch resistance of the rubber composition for a tire tread is superior. Furthermore, when the weight average molecular weight is not less than 1000, the low rolling resistance of the obtained tire is superior.

The ratio (Mw/Mn) of the weight average molecular weight (Mw) to the number average molecular weight (Mn) of the conjugated diene-based rubber (A) is preferably from 1.1 to 3.0, more preferably from 1.2 to 2.5, and particularly preferably from 1.3 to 2.2. When this molecular weight distribution (Mw/Mn) is not greater than 3.0, the low rolling resistance of the obtained tire is superior.

The Mooney viscosity ($ML_{1+4}$ (100° C.)) of the conjugated diene-based rubber (A) is not particularly limited, but is normally from 20 to 100, preferably from 30 to 90, and more preferably from 40 to 85. When the conjugated diene-based rubber (A) is obtained as an oil-extended rubber, the Mooney viscosity of that oil-extended rubber is the same as the ranges above.

As described above, the rubber component contained in the rubber composition of the present technology is not particularly limited as long as it contains not less than 30 mass % of this conjugated diene-based rubber (A), but it preferably contains not less than 40 mass %, more preferably not less than 50 mass %, and even more preferably from 60 to 90 mass %, of the conjugated diene-based rubber (A).

<Diene-based Rubber>

As described above, the rubber component contained in the rubber composition of the present technology may also contain a diene-based rubber other than the conjugated diene-based rubber (A) ("other diene-based rubber" hereinafter).

The other diene-based rubber is not particularly limited, but specific examples of the other diene rubber include natural rubber (NR), isoprene rubber (IR), butadiene rubber (BR), aromatic vinyl-conjugated diene copolymer rubber, acrylonitrile-butadiene copolymer rubber (NBR), butyl rubber (IIR), halogenated butyl rubber (Br-IIR, Cl-IIR), chloroprene rubber (CR), and the like. A single type of other diene-based rubber may be used alone, or two or more types may be used in combination.

When such other diene-based rubbers are included, the content of the other diene-based rubbers is preferably less than 60 mass %, and more preferably less than 50 mass %, of the rubber component.

[Silica (B)]

The silica (B) contained in the rubber composition of the present technology has a nitrogen adsorption specific surface area from 194 to 225 $m^2/g$ and a cetyl trimethyl ammonium bromide (CTAB) adsorption specific surface area from 180 to 210 $m^2/g$.

Here, the nitrogen adsorption specific surface area is the adsorbed amount of nitrogen on the silica surface measured according to JIS K6217-2:2001 "Part 2: Method for determining specific surface area—Nitrogen adsorption method—Single point method."

The CTAB adsorption specific surface area is the adsorbed amount of CTAB on the silica surface measured according to JIS K6217-3:2001 "Part 3: Method for determining specific surface area—CTAB adsorption method."

By using a predetermined amount of silica (B) having such surface properties, a tire having excellent wet performance, rolling resistance, and wear resistance can be produced as described above.

The above silica (B) is not particularly limited as long as it satisfies the surface properties described above, and can be any conventional, publicly known silica that is blended in rubber compositions used in tires and the like.

Examples of the above silica (B) include wet silica, dry silica, fumed silica, diatomaceous earth, and the like, and a single type may be used alone or a combination of two or more types may be used.

In the present technology, the content of the silica (B) is from 60 to 150 parts by mass per 100 parts by mass of the above rubber component, and is preferably from 65 to 145 parts by mass, and even more preferably from 70 to 140 parts by mass, because the wet performance, low rolling resistance, and processability are superior.

[Alkyltriethoxysilane (C)]

The alkyltriethoxysilane (C) contained in the rubber composition of the present technology is a silane compound represented by formula (I) below.

By using a predetermined amount of an alkyltriethoxysilane (C) having such a structure, a rubber composition having excellent processability can be obtained and a tire having excellent wear resistance can be produced, as described above.

(I)

(In the formula, R is an alkyl group having from 7 to 20 carbons.) Here, specific examples of the alkyl group having from 7 to 20 carbons of R include a heptyl group, an octyl group, a nonyl group, a decyl group, an undecyl group, a dodecyl group, and the like.

Among these, an octyl group and a nonyl group are preferred from the perspective of miscibility with the rubber components described above.

In the present technology, the content of the alkyltriethoxysilane (C) is from 2.5 to 8.0 mass % relative to the content of the silica (B), and from the perspective of better wet performance, low rolling resistance, wear resistance, and processability, it is preferably from 3.0 to 7.5 mass %, and more preferably from 4.0 to 7.0 mass %.

[Silane Coupling Agent]

The rubber composition of the present technology preferably contains a silane coupling agent because it improves the dispersibility of the silica (B).

Specific examples of the above silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropyl benzothiazole tetrasulfide, and the like.

The content of such a silane coupling agent is preferably from 0.1 to 15 mass %, and more preferably from 2.0 to 13 mass %, relative to the content of the silica (B).

[Other Optional Components]

The rubber composition of the present technology may further contain additives as necessary within a scope that does not inhibit the effect or purpose thereof.

Examples of the additives include various additives that are typically used in rubber compositions for tire treads, such as fillers other than the silica (B) contained in the rubber composition of the present technology (e.g., carbon black), zinc oxide, stearic acid, antiaging agents, processing aids, aroma oils, process oils, liquid polymers, terpene resins, thermosetting resins, vulcanizing agents, and vulcanization accelerators.

[Production Method of Rubber Composition for a Tire Tread]

The method for producing the rubber composition of the present technology is not particularly limited, and specific examples thereof include a method whereby each of the above-mentioned components is kneaded using a publicly known method and device (e.g. Banbury mixer, kneader, roller, and the like).

In addition, the rubber composition of the present technology can be vulcanized or crosslinked under conventional, publicly known vulcanizing or crosslinking conditions.

[Pneumatic Tire]

The pneumatic tire of the present technology is a pneumatic tire that uses the rubber composition of the present technology described above in the tire treads.

FIG. 1 is a partial cross-sectional schematic view of a tire that represents one embodiment of the pneumatic tire of the present technology, but the pneumatic tire of the present technology is not limited to the embodiment illustrated in FIG. 1.

In FIG. 1, reference number 1 denotes a bead portion, reference number 2 denotes a side wall portion, and reference number 3 denotes a tire tread portion.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire periphery of the tire on the outer side of the carcass layer 4.

Additionally, rim cushions 8 are provided in parts of the bead portions 1 that are in contact with a rim.

The pneumatic tire of the present technology is not particularly limited with the exception that the rubber composition of the present technology is used for the treads of the pneumatic tire, and, for example, the tire can be produced in accordance with a conventionally known method. In addition to ordinary air or air with an adjusted oxygen partial pressure, inert gases such as nitrogen, argon, and helium may be used as the gas with which the tire is filled.

EXAMPLES

Hereinafter, the present technology will be further described in detail using examples; however, the present technology is not limited thereto.

<Production Method of Conjugated Diene-based Rubber A1>

In a nitrogen-replaced 100 mL ampoule bottle, 28 g of cyclohexane and 8.6 mmol of tetramethylethylenediamine were added, and then 6.1 mmol of n-butyllithium was further added. Then, 8.0 g of isoprene was slowly added, and the mixture was reacted for 120 minutes in the 60° C. ampoule bottle to yield isoprene block (used as initiator 1). The weight average molecular weight, molecular weight distribution, and isoprene unit-derived vinyl bond content of this initiator 1 were measured. The measurement results are shown in Table 1.

Then, in a nitrogen atmosphere in an autoclave equipped with a stirrer, 4000 g of cyclohexane, 357.7 g of 1,3-butadiene, and 132.3 g of styrene were loaded, and then the entire amount of initiator 1 was added, and polymerization of the mixture was initiated at 40° C. Ten minutes after polymerization was initiated, 195.3 g of 1,3-butadiene and 14.7 g of styrene were continuously added over the course of 60 minutes. The maximum temperature during the polymerization reaction was 60° C. After continuous addition was completed, the polymerization reaction was continued for another 20 minutes, and after it was confirmed that the polymer conversion ratio had reached from 95 to 100%, 0.08 mmol of 1,6-bis(trichlorosilyl)hexane was added in the state of a cyclohexane solution having a 20 mass % concentration, and the mixture was reacted for 10 minutes. Furthermore, 0.027 mmol of the polyorganosiloxane represented by formula (7) below was added in the state of a xylene solution having a 20 mass % concentration, and the mixture was reacted for 30 minutes. After that, methanol in an amount equivalent to twice the number of moles of n-butyllithium used was added as a polymerization inhibitor, and a solution containing conjugated diene-based rubber A1 was obtained. To this solution, Irganox 1520L (manufactured by Ciba Specialty Chemicals Corp.) was added as an antiaging agent in an amount of 0.15 parts by mass relative to 100 parts by mass of conjugated diene-based rubber A1, the solvent was removed by steam stripping, and the resulting substance was vacuum-dried for 24 hours at 60° C. to produce solid conjugated diene-based rubber A1.

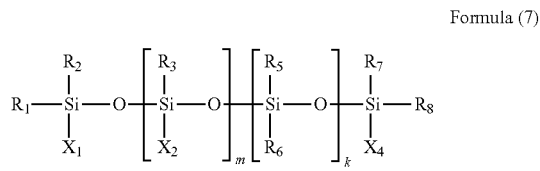

Formula (7)

In formula (7), $X_1$, $X_4$, $R_1$ to $R_3$, and $R_5$ to $R_8$ are each a methyl group. In formula (7), m is 80, and k is 120. In formula (7), $X_2$ is a group represented by formula (8) below (where * indicates a bond position).

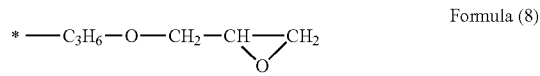

Formula (8)

The weight average molecular weight, molecular weight distribution, coupling ratio, styrene unit content in the portions other than the isoprene block, vinyl bond content in the portions other than the isoprene block, and Mooney viscosity were measured for the conjugated diene-based rubber A1. The measurement results are shown in Table 2. The measurement method is as follows.

(Weight Average Molecular Weight, Molecular Weight Distribution, and Coupling Ratio)

The weight average molecular weight, molecular weight distribution, and coupling ratio (proportion of structural member (a) relative to conjugated diene-based rubber (A) (mass %)) were determined using a chart obtained by gel permeation chromatography based on molecular weight in terms of polystyrene. The specific gel permeation chromatography measurement method is as follows.

Measurement instrument: HLC-8020 (manufactured by Tosoh Corp.)
    Column: GMH-HR-H (manufactured by Tosoh Corp.), two connected in serial
    Detector: Differential refractometer RI-8020 (manufactured by Tosoh Corp.)
    Eluent: Tetrahydrofuran
    Column temperature: 40° C.

Here, the coupling ratio is the ratio (s2/s1) of the area (s2) of the peak portion having a peak top molecular weight not less than 2.8 times the peak top molecular weight indicated by the peak of smallest molecular weight to the total elution area (s1).

(Styrene Unit Content and Vinyl Bond Content)

The styrene unit content and vinyl bond content were measured by $^1$H-NMR.

(Mooney Viscosity)

Mooney viscosity ($ML_{1+4}$ (100° C.)) was measured in accordance with JIS K6300-1:2001.

<Production Method of Conjugated Diene-based Rubber A2>

In a nitrogen-replaced 100 mL ampoule bottle, 28 g of cyclohexane and 7.5 mmol of tetramethylethylenediamine were added, and then 5.4 mmol of n-butyllithium was further added. Then, 7.0 g of isoprene was slowly added, and the mixture was reacted for 120 minutes in the ampoule bottle at 70° C. to yield isoprene block (used as initiator 2). The weight average molecular weight, molecular weight distribution, and isoprene unit-derived vinyl bond content were measured for this initiator 2. The measurement results are shown in Table 1.

Then, in a nitrogen atmosphere in an autoclave equipped with a stirrer, 4000 g of cyclohexane, 357.7 g of 1,3-butadiene, and 132.3 g of styrene were loaded, and then the entire amount of initiator 2 was added, and polymerization of the mixture was initiated at 40° C. Ten minutes after polymerization was initiated, 195.3 g of 1,3-butadiene and 14.7 g of styrene were continuously added over the course of 60 minutes. The maximum temperature during the polymerization reaction was 60° C. After continuous addition was completed, the polymerization reaction was continued for another 20 minutes, and after it was confirmed that the polymer conversion ratio had reached from 95 to 100%, 0.023 mmol of the polyorganosiloxane A represented by formula (7) above was added in the state of a xylene solution having a 20 mass % concentration, and the mixture was reacted for 30 minutes. After that, methanol in an amount equivalent to twice the number of moles of n-butyllithium used was added as a polymerization inhibitor, and a solution containing conjugated diene-based rubber A2 was obtained. To this solution, Irganox 1520L (manufactured by Ciba Specialty Chemicals Corp.) was added as an antiaging agent in an amount of 0.15 parts by mass relative to 100 parts by mass of conjugated diene-based rubber A2, the solvent was removed by steam stripping, and the resulting substance was vacuum-dried for 24 hours at 60° C. to produce solid conjugated diene-based rubber A2.

The weight average molecular weight, molecular weight distribution, coupling ratio, styrene unit content in the portions other than the isoprene block, vinyl bond content in the portions other than the isoprene block, and Mooney viscosity were measured for the conjugated diene-based rubber A2. The measurement results are shown in Table 2. The measurement method is the same as that described above.

TABLE 1

|  | Initiator 1 | Initiator 2 |
|---|---|---|
| Weight average molecular weight ($\times 10^4$) | 0.22 | 0.25 |
| Vinyl bond content (wt %) | 72.3 | 54.8 |
| Molecular weight distribution (Mw/Mn) | 1.08 | 1.09 |

TABLE 2

|  | Conjugated diene-based rubber A1 | Conjugated diene-based rubber A2 |
|---|---|---|
| Styrene unit content (wt %) | 21.0 | 21.1 |
| Vinyl bond content (wt %) | 63.3 | 62.9 |
| Weight average molecular weight ($\times 10^4$) | 43.5 | 47.8 |
| Molecular weight distribution (Mw/Mn) | 1.46 | 1.50 |
| Coupling rate of 3 or more branches (wt %) | 25.0 | 21.0 |
| Mooney viscosity | 58.0 | 65.6 |

Reference Example, Working Examples 1 to 5, and Comparative Examples 1 to 10

The components shown in Table 3 below were blended in the proportions (parts by mass) shown in Table 3. Furthermore, in Table 3, for alkyl silane C1, comparative alkylsilane 1, and the silane coupling agent, the mass % relative to silica is also listed in parentheses after the parts by mass.

Specifically, a master batch was obtained by first heating, to a temperature near 150° C., the components shown in Table 3, excluding the sulfur and the vulcanization accelerator, for 5 minutes in a 1.7-liter closed-type Banbury mixer, and then discharging the mixture and cooling it to room temperature. Further, sulfur and a vulcanization accelerator were mixed into the resulting master batch using the Banbury mixer described above so as to obtain a rubber composition for a tire tread.

<Mooney Viscosity> (Indicator of Processability)

The Mooney viscosity of the prepared rubber composition (unvulcanized) for a tire tread was measured with a preheating time of 1 minute, a rotor rotation time of 4 minutes, and a test temperature of 100° C. using an L-shaped rotor in accordance with JIS K6300-1:2001.

The results are shown in Table 3. The results are displayed as an index when the value of a reference example is defined as 100. A larger index indicates superior processability.

<tan δ (0° C.)> (Indicator of Wet Performance)

A vulcanized rubber sheet was prepared by press-vulcanizing the prepared (unvulcanized) rubber composition for a tire tread for 20 minutes at 160° C. in a mold (15 cm×15 cm×0.2 cm).

The value of tan δ (0° C.) was measured for the produced vulcanized rubber sheet with an elongation deformation distortion of 10%±2%, an oscillation frequency of 20 Hz, and a temperature of 0° C. using a viscoelastic spectrometer (produced by Iwamoto Manufacturing) in accordance with JIS K6394:2007.

The results are shown in Table 3. The results are displayed as an index when the value of tan δ (0° C.) of a reference example is defined as 100. Larger indexes indicate larger tan δ (0° C.) values, which in turn indicate excellent wet performance when used in a tire.

<Tan δ (60° C.)> (Indicator of Low Rolling Resistance)

A vulcanized rubber sheet was prepared by press-vulcanizing the prepared (unvulcanized) rubber composition for a tire tread for 20 minutes at 160° C. in a mold (15 cm×15 cm×0.2 cm).

The value of tan δ (60° C.) was measured for the produced vulcanized rubber sheet with an elongation deformation distortion of 10%±2%, an oscillation frequency of 20 Hz, and a temperature of 60° C. using a viscoelastic spectrometer (produced by Iwamoto Manufacturing) in accordance with JIS K6394:2007.

The results are shown in Table 3. The results are displayed as an index when the value of tan δ (60° C.) of a reference example is defined as 100. Smaller index values indicate smaller tan δ (60° C.) values, which in turn indicate excellent low rolling resistance when used in a pneumatic tire.

<Wear Resistance>

A vulcanized rubber sheet was prepared by press-vulcanizing the prepared (unvulcanized) rubber composition for a tire tread for 20 minutes at 160° C. in a mold (15 cm×15 cm×0.2 cm).

The produced vulcanized rubber sheet was subjected to determination in accordance with JIS K6264 under a load of 1.5 kg and a slip rate of 50% using a Lambourn abrasion tester (manufactured by Iwamoto Seisakusyo K.K.) and the amount of wear of the sample was measured.

The wear resistance was the amount of wear of the sample converted to an index by the following formula, with the amount of wear of a reference example is defined as 100. A higher numerical value indicates superior wear resistance.

Wear resistance=(amount of wear of comparative example 1/amount of wear of sample)×100.

TABLE 3

|  | Reference Example | Comparative Example 1 | Comparative Example 2 | Comparative Example 3 |
|---|---|---|---|---|
| Conjugated diene-based rubber A1 | 75 | — | — | — |
| Conjugated diene-based rubber A2 | — | — | — | — |
| Comparative conjugated diene-based rubber 1 | — | 75 | 75 | 75 |
| Butadiene rubber | 25 | 25 | 25 | 25 |
| Carbon black | 10 | 10 | 10 | 10 |
| Silica B1 | 80 | 80 | 80 | — |
| Silica B2 | — | — | — | — |
| Comparative silica 1 | — | — | — | 80 |
| Comparative silica 2 | — | — | — | — |
| Alkylsilane C1 | — | 4 | 1.6 | 4 |
| (mass % relative to silica) |  | (5%) | (2%) | (5%) |
| Comparative alkylsilane 1 | — | — | — | — |
| (mass % relative to silica) |  |  |  |  |
| Silane coupling agent | 6.4 | 6.4 | 6.4 | 6.4 |
| (mass % relative to silica) | (8%) | (8%) | (8%) | (8%) |
| Zinc oxide | 2.5 | 2.5 | 2.5 | 2.5 |
| Stearic acid | 2 | 2 | 2 | 2 |
| Antiaging agent | 2 | 2 | 2 | 2 |
| Wax | 2 | 2 | 2 | 2 |
| Process oil | 15 | 15 | 15 | 15 |
| Sulfur | 1.5 | 1.5 | 1.5 | 1.5 |
| Vulcanization accelerator 1 | 1.7 | 1.7 | 1.7 | 1.7 |
| Vulcanization accelerator 2 | 0.5 | 0.5 | 0.5 | 0.5 |
| Mooney viscosity | 100 | 95 | 103 | 86 |
| tan δ (0° C.) | 100 | 100 | 95 | 97 |
| tan δ (60° C.) | 100 | 100 | 107 | 96 |
| Wear resistance | 100 | 103 | 100 | 97 |

|  | Comparative Example 4 | Comparative Example 5 | Comparative Example 6 | Comparative Example 7 |
|---|---|---|---|---|
| Conjugated diene-based rubber A1 | 75 | 75 | 75 | 75 |
| Conjugated diene-based rubber A2 | — | — | — | — |
| Comparative conjugated diene-based rubber 1 | — | — | — | — |
| Butadiene rubber | 25 | 25 | 25 | 25 |
| Carbon black | 10 | 10 | 10 | 10 |
| Silica B1 | 80 | 80 | — | — |
| Silica B2 | — | — | — | — |
| Comparative silica 1 | — | — | 80 | — |
| Comparative silica 2 | — | — | — | 80 |
| Alkylsilane C1 | 8 | 1.6 | 4 | 4 |
| (mass % relative to silica) | (10%) | (2%) | (5%) | (5%) |
| Comparative alkylsilane 1 | — | — | — | — |
| (mass % relative to silica) |  |  |  |  |
| Silane coupling agent | 6.4 | 6.4 | 6.4 | 6.4 |
| (mass % relative to silica) | (8%) | (8%) | (8%) | (8%) |
| Zinc oxide | 2.5 | 2.5 | 2.5 | 2.5 |

TABLE 3-continued

|  |  |  |  |  |
|---|---|---|---|---|
| Stearic acid | 2 | 2 | 2 | 2 |
| Antiaging agent | 2 | 2 | 2 | 2 |
| Wax | 2 | 2 | 2 | 2 |
| Process oil | 15 | 15 | 15 | 15 |
| Sulfur | 1.5 | 1.5 | 1.5 | 1.5 |
| Vulcanization accelerator 1 | 1.7 | 1.7 | 1.7 | 1.7 |
| Vulcanization accelerator 2 | 0.5 | 0.5 | 0.5 | 0.5 |
| Mooney viscosity | 81 | 97 | 81 | 85 |
| tan δ (0° C.) | 105 | 102 | 104 | 106 |
| tan δ (60° C.) | 80 | 97 | 84 | 86 |
| Wear resistance | 96 | 102 | 98 | 100 |

|  | Comparative Example 8 | Comparative Example 9 | Comparative Example 10 |
|---|---|---|---|
| Conjugated diene-based rubber A1 | 75 | 25 | 75 |
| Conjugated diene-based rubber A2 | — | — | — |
| Comparative conjugated diene-based rubber 1 | — | 50 | — |
| Butadiene rubber | 25 | 25 | 25 |
| Carbon black | 40 | 10 | 10 |
| Silica B1 | 50 | — | 80 |
| Silica B2 | — | 80 | — |
| Comparative silica 1 | — | — | — |
| Comparative silica 2 | — | — | — |
| Alkylsilane C1 | 2.5 | 4 | — |
| (mass % relative to silica) | (5%) | (5%) |  |
| Comparative alkylsilane 1 | — | — | 4 |
| (mass % relative to silica) |  |  | (5%) |
| Silane coupling agent | 4 | 6.4 | 6.4 |
| (mass % relative to silica) | (8%) | (8%) | (8%) |
| Zinc oxide | 2.5 | 2.5 | 2.5 |
| Stearic acid | 2 | 2 | 2 |
| Antiaging agent | 2 | 2 | 2 |
| Wax | 2 | 2 | 2 |
| Process oil | 15 | 15 | 15 |
| Sulfur | 1.5 | 1.5 | 1.5 |
| Vulcanization accelerator 1 | 1.7 | 1.7 | 1.7 |
| Vulcanization accelerator 2 | 0.5 | 0.5 | 0.5 |
| Mooney viscosity | 81 | 91 | 96 |
| tan δ (0° C.) | 90 | 106 | 101 |
| tan δ (60° C.) | 110 | 92 | 99 |
| Wear resistance | 107 | 101 | 99 |

|  | Reference Example | Working Example 1 | Working Example 2 |
|---|---|---|---|
| Conjugated diene-based rubber A1 | 75 | 75 | — |
| Conjugated diene-based rubber A2 | — | — | 75 |
| Comparative conjugated diene-based rubber 1 | — | — | — |
| Butadiene rubber | 25 | 25 | 25 |
| Carbon black | 10 | 10 | 10 |
| Silica B1 | 80 | 80 | 80 |
| Silica B2 | — | — | — |
| Comparative silica 1 | — | — | — |
| Comparative silica 2 | — | — | — |
| Alkylsilane C1 | — | 4 | 4 |
| (mass % relative to silica) |  | (5%) | (5%) |
| Comparative alkylsilane 1 | — | — | — |
| (mass % relative to silica) |  |  |  |
| Silane coupling agent | 6.4 | 6.4 | 6.4 |
| (mass % relative to silica) | (8%) | (8%) | (8%) |
| Zinc oxide | 2.5 | 2.5 | 2.5 |
| Stearic acid | 2 | 2 | 2 |
| Antiaging agent | 2 | 2 | 2 |
| Wax | 2 | 2 | 2 |
| Process oil | 15 | 15 | 15 |
| Sulfur | 1.5 | 1.5 | 1.5 |
| Vulcanization accelerator 1 | 1.7 | 1.7 | 1.7 |
| Vulcanization accelerator 2 | 0.5 | 0.5 | 0.5 |
| Mooney viscosity | 100 | 86 | 85 |
| tan δ (0° C.) | 100 | 110 | 112 |
| tan δ (60° C.) | 100 | 86 | 85 |
| Wear resistance | 100 | 108 | 110 |

TABLE 3-continued

|  | Working Example 3 | Working Example 4 | Working Example 5 |
|---|---|---|---|
| Conjugated diene-based rubber A1 | — | 75 | — |
| Conjugated diene-based rubber A2 | 75 | — | 40 |
| Comparative conjugated diene-based rubber 1 | — | — | 35 |
| Butadiene rubber | 25 | 25 | 25 |
| Carbon black | 10 | 10 | 10 |
| Silica B1 | — | 80 | — |
| Silica B2 | 80 | — | 80 |
| Comparative silica 1 | — | — | — |
| Comparative silica 2 | — | — | — |
| Alkylsilane C1 | 4 | 5.6 | 4 |
| (mass % relative to silica) | (5%) | (7%) | (5%) |
| Comparative alkylsilane 1 | — | — | — |
| (mass % relative to silica) |  |  |  |
| Silane coupling agent | 6.4 | 6.4 | 6.4 |
| (mass % relative to silica) | (8%) | (8%) | (8%) |
| Zinc oxide | 2.5 | 2.5 | 2.5 |
| Stearic acid | 2 | 2 | 2 |
| Antiaging agent | 2 | 2 | 2 |
| Wax | 2 | 2 | 2 |
| Process oil | 15 | 15 | 15 |
| Sulfur | 1.5 | 1.5 | 1.5 |
| Vulcanization accelerator 1 | 1.7 | 1.7 | 1.7 |
| Vulcanization accelerator 2 | 0.5 | 0.5 | 0.5 |
| Mooney viscosity | 82 | 83 | 87 |
| tan δ (0° C.) | 112 | 112 | 109 |
| tan δ (60° C.) | 83 | 82 | 87 |
| Wear resistance | 109 | 107 | 105 |

The details of each component shown in Table 3 above are as follows.
Conjugated diene-based rubber A1: Conjugated diene-based rubber A1 produced as described above
Conjugated diene-based rubber A2: Conjugated diene-based rubber A2 produced as described above
Comparative conjugated diene-based rubber 1: NS616 (manufactured by Zeon Corporation) (terminal-modified SSBR for silica)
Butadiene rubber: Nipol 1220 (manufactured by Zeon Corporation)
Carbon black: Show Black N339 (CTAB adsorption specific surface area = 90 m$^2$/g, manufactured by Cabot Japan)
Silica B1: 200MP (nitrogen adsorption specific surface area: 207 m$^2$/g, CTAB adsorption specific surface area: 198 m$^2$/g, manufactured by Rhodia S.A.)
Silica B2: 9000GR (nitrogen adsorption specific surface area: 213 m$^2$/g, CTAB adsorption specific surface area: 193 m$^2$/g, manufactured by Evonik Industries GMBH)
Comparative silica 1: Zeosil 1165MP (nitrogen adsorption specific surface area: 160 m$^2$/g, CTAB adsorption specific surface area: 159 m$^2$/g, manufactured by Rhodia S.A.)
Comparative silica 2: AQ (nitrogen adsorption specific surface area: 211 m$^2$/g, CTAB adsorption specific surface area: 160 m$^2$/g, manufactured by Tosoh Silica Corp.)
Alkylsilane C1: Octyltriethoxysilane (KBE-3083, manufactured by Shin-Etsu Silicone Co., Ltd.)
Comparative alkylsilane 1: Dimethyldiethoxysilane (KBE-22, manufactured by Shin-Etsu Silicone Co., Ltd.)
Silane coupling agent: Si69 (manufactured by Degussa AG)
Zinc oxide: Zinc Oxide #3 (manufactured by Seido Chemical Industry Co., Ltd.)
Stearic acid: Stearic acid YR (manufactured by NOF Corp.)
Antiaging agent: Santoflex 6PPD (manufactured by Solutia Europe)
Wax: Paraffin wax (manufactured by Ouchi Shinko Chemical Industrial Co., Ltd.)
Process oil: Extract No. 4 S (manufactured by Showa Shell Seikyu K.K.)
Sulfur: Oil-treated sulfur (manufactured by Tsurumi Chemical Industry Co., Ltd.)
Vulcanization accelerator 1: Nocceler CZ-G (manufactured by Ouchi Shinko Chemical Industrial Co., Ltd.)
Vulcanization accelerator 2: Perkacit DPG (manufactured by Flexsys Chemicals)

From the results shown in Table 3 it was found that the rubber compositions prepared without compounding conjugated diene-based rubber (A) were the same or worse than the Reference Example in at least one parameter among processability, wet performance, low rolling resistance, and wear resistance (Comparative Examples 1 to 3).

Furthermore, it was found that a rubber composition containing a large amount of alkyltriethoxysilane (C) had poor wear resistance (Comparative Example 4), and a rubber composition having a small amount of alkyltriethoxysilane (C) had insufficient improvement effects on processability, wet performance, low rolling resistance, and wear resistance (Comparative Example 5).

It was also found that rubber compositions in which silica was compounded that did not satisfy the specified surface properties had poor wear resistance (Comparative Examples 6 and 7).

Furthermore, it was found that a rubber composition containing a small amount of silica (B) had poor wet performance and low rolling resistance Comparative Example 8

Furthermore, it was found that a rubber composition containing a small amount of conjugated diene-based rubber (A) had insufficient improvement effects on processability, wet performance, low rolling resistance, and wear resistance (Comparative Example 9).

It was found that a rubber composition in which dimethyldiethoxysilane does not correspond to the alkyltriethoxysilane (C) had insufficient improvement effects on processability, wet performance, and low rolling resistance, and had poor wear resistance (Comparative Example 10).

In contrast, it was found that the rubber compositions in which a predetermined content of conjugated diene-based rubber (A), silica (B), and alkyltriethoxysilane (C) were used in combination all had good processability, as well as good wet performance, low rolling resistance, and wear resistance when a tire is produced (Working Examples 1 to 5).

What is claimed is:

1. A rubber composition for a tire tread comprising:
a rubber component containing not less than 30 mass % of a conjugated diene-based rubber (A);
a silica (B); and
an alkyltriethoxysilane (C) represented by the following formula (I),

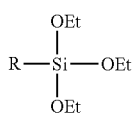

(I)

wherein R is an alkyl group having from 8 to 18 carbons,
the conjugated diene-based rubber (A) containing not less than 5 mass % of a structural member (a), in which not less than three conjugated diene-based polymer chains (a1) are bonded via a modifier (a2), obtained by a reaction of the conjugated diene-based polymer chains (a1) and the modifier (a2);
the conjugated diene-based polymer chain (a1) including an isoprene block containing not less than 70 mass % of isoprene units on one terminal and containing an active terminal on the other terminal;
the modifier (a2) including at least one group selected from an epoxy group and a hydrocarbyloxysilyl group, a total number of the epoxy groups and hydrocarbyloxy groups contained in the hydrocarbyloxysilyl group being not less than three;
the silica (B) having a nitrogen adsorption specific surface area from 194 to 225 m²/g and a cetyl trimethyl ammonium bromide (CTAB) adsorption specific surface area from 180 to 210 m²/g;
a content of the silica (B) being from 60 to 150 parts by mass per 100 parts by mass of the rubber component; and
a content of the alkyltriethoxysilane (C) being from 3.0 to 7.0 mass % relative to the silica (B).

2. The rubber composition for a tire tread according to claim 1, wherein the modifier (a2) is a polyorganosiloxane.

3. The rubber composition for a tire tread according to claim 2, wherein a vinyl bond content derived from an isoprene unit in the isoprene block is from 21 to 85 mass %.

4. The rubber composition for a tire tread according to claim 1, wherein a vinyl bond content derived from an isoprene unit in the isoprene block is from 21 to 85 mass %.

5. The rubber composition for a tire tread according to claim 1, wherein the composition contains bis(3-triethoxysilylpropyl)tetrasulfide as a silane coupling agent.

6. The rubber composition for a tire tread according to claim 1, wherein the alkyltriethoxysilane (C) comprises octyltriethoxysilane.

7. The rubber composition for a tire tread according to claim 1, wherein the rubber component contains 30 to 90 mass % of the conjugated diene-based rubber (A).

8. The rubber composition for a tire tread according to claim 7, wherein the composition contains bis(3-triethoxysilylpropyl)tetrasulfide as a silane coupling agent.

9. The rubber composition for a tire tread according to claim 7, wherein the silica (B) has a nitrogen adsorption specific surface area from 213 to 225 m²/g.

10. The rubber composition for a tire tread according to claim 9, wherein the composition contains bis(3-triethoxysilylpropyl)tetrasulfide as a silane coupling agent.

11. The rubber composition for a tire tread according to claim 1, wherein the silica (B) has a nitrogen adsorption specific surface area from 213 to 225 m²/g.

12. The rubber composition for a tire tread according to claim 11, wherein the composition contains bis(3-triethoxysilylpropyl)tetrasulfide as a silane coupling agent.

13. The rubber composition for a tire tread according to claim 1, wherein the nitrogen adsorption specific surface area of the silica (B) is 213 m²/g.

14. A pneumatic tire comprising a tire tread formed using the rubber composition for a tire tread described in claim 1.

15. A pneumatic tire comprising a tire tread formed using the rubber composition for a tire tread described in claim 2.

16. A pneumatic tire comprising a tire tread formed using the rubber composition for a tire tread described in claim 4.

* * * * *